Nov. 7, 1961     A. G. SCHILBERG     3,007,713

FABRICATED EQUALIZER BEAM

Filed April 7, 1959

INVENTOR.
ARNOLD G. SCHILBERG
BY
*Andrus + Starke*
Attorneys ately shaped, spaced web sections and sharply tapered flanges with the corresponding flanges of opposite channel members defining a V-shaped notch in the beam end.

3,007,713
FABRICATED EQUALIZER BEAM
Arnold G. Schilberg, Milwaukee, Wis., assignor to A. O. Smith Corporation, Milwaukee, Wis., a corporation of New York
Filed Apr. 7, 1959, Ser. No. 804,770
2 Claims. (Cl. 280—104.5)

The present invention relates to an equalizer beam and more particularly to an equalizer beam fabricated of pressed metal members.

In the design of trucks, trailers and other wheeled members having tandem axles, equalizer beams are normally employed to distribute the load evenly on each axle while permitting the wheels associated therewith to individually respond to road irregularities. In general, an equalizer beam is disposed on each side of the vehicle in parallel relation thereto and beneath a leaf, coil, rubber or pneumatic spring attached directly to the vehicle frame. A hanger carried by the underside of the spring is pivotally connected to the mid-section of the equalizer beam. Opposite ends of the beam, in turn, are pivotally connected to adjacent ends of the tandem axles interiorly of the wheels associated therewith to thus support the vehicle body on the axles.

In the usual instance, the equalizer beam is either of forged or cast construction with the resultant beam being heavy and expensive of manufacture.

The present invention is directed to a light-weight equalizer beam which may be inexpensively manufactured and which has a relatively high strength. According to the invention, the beam is formed of a pair of light-gauge, pressed metal, channel members secured together with the flanges of the respective channels extending toward one another in nesting engagement to form a box-like section. The beam is at maximum depth and height in its mid-section and is tapered inwardly in both dimensions toward either end of the beam to form end portions of reduced cross section.

The beam channel members terminate in arcuately shaped, spaced web sections and sharply tapered flanges with the corresponding flanges of opposite channel members defining a V-shaped notch in the beam end.

The design of the beam is adapted to provide for efficient utilization of beam material and to eliminate material having no load bearing function wherever possible.

The beam is provided with longitudinally aligned, transversely extending eyes at the ends and mid-section of the beam which connect to suitable supporting means depending from the axles and vehicle frame respectively. Each eye is formed of a bearing sleeve inserted through aligned openings provided in the web sections of opposed channel members.

The accompanying drawing illustrates the best mode presently contemplated of carrying out the invention.

Figure 1:
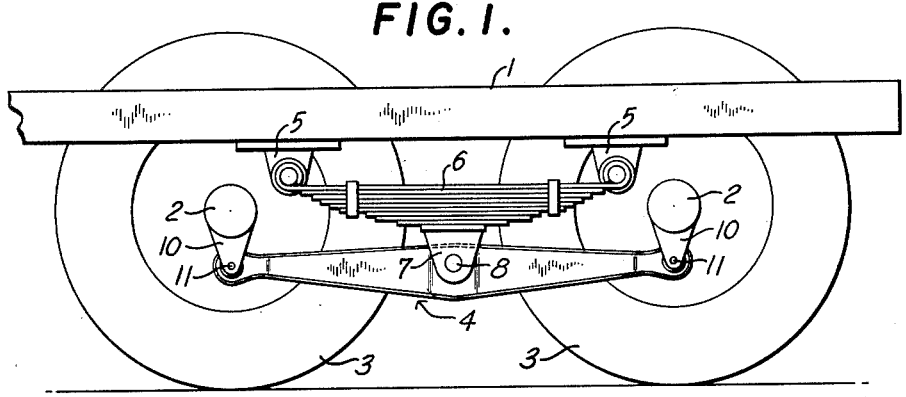
FIGURE 1 is an interior diagrammatic side elevational view of the equalizer beam of the invention as applied to a vehicle or the like with a portion only thereof being shown.

The drawings illustrate a dual axle vehicle which includes a pair of I-beam frame members 1 extending longitudinally along opposite sides of the vehicle and a pair of transversely extending tandem axles 2 disposed beneath frame members 1. Each of the axles 2 rotatably supports a pair of wheels 3.

The vehicle load is transmitted equally to axles 2 and wheels 3 by a pair of equalizer beams 4 mounted one on each side of the vehicle. Each beam is of identical construction and connects to the vehicle and axles in similar fashion, thus only one such beam is shown and described hereinafter.

Each frame member 1 carries a pair of longtudinally spaced brackets 5 which support a leaf spring 6 having a downwardly extending bifurcated hanger 7 secured to the lower side of the spring. The central portion of beam 4 is disposed between the bifurcated arm of hanger 7 and is pivotally secured to the arm by a pin 8 which extends through aligned openings in the arm and through an eye 9 in the beam.

Each end of beam 4 is pivotally secured to the bifurcated lower end of a bracket 10 rotatably secured to axle 2 interiorly of wheels 3 by a pin 11 which extends through aligned openings in bracket 10 and through an eye 12 in beam 4.

Figure 2:
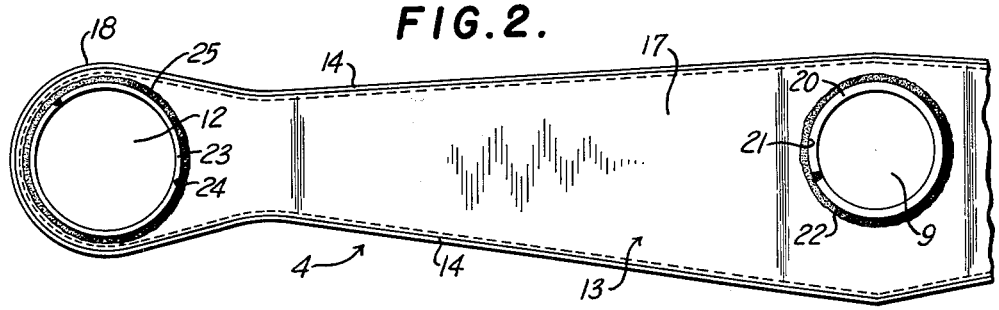
FIG. 2 is a side elevational view of a portion of the beam.
Figure 3:
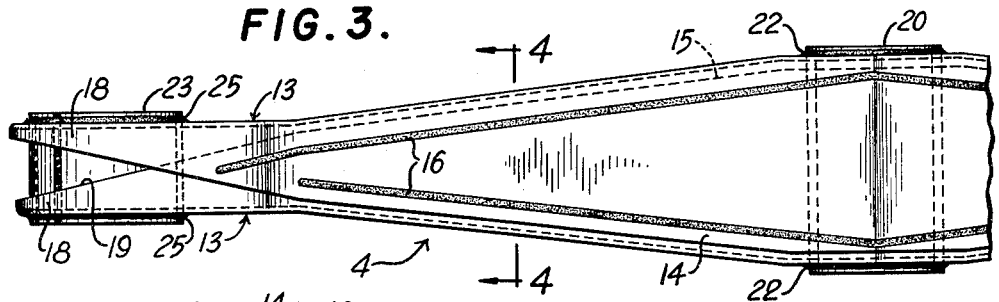
FIG. 3 is a top plan view of the portion of the beam shown in FIG. 2.
Figure 4:
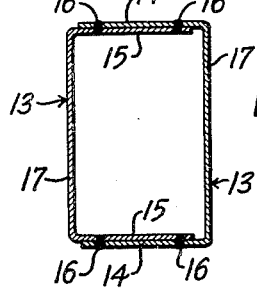
FIG. 4 is a section along the line 4—4 of FIG. 3.

Referring to the equalizer beam structure as particularly shown in FIGS. 2-4, beam 4 is formed of a pair of facing channel members 13 with the flanges 14 of one member overlapping the corresponding flanges 15 of the other member to form a box-section.

Channel members 13 are rigidly secured together in the aforedescribed facing relation by a pair of burnthrough longitudinal welds 16 disposed along each outer flange 14. Welds 16 extend generally the length of beam 4 and parallel the outer edges of the outer and inner flanges 14 and 15, respectively.

Members 13 are pressed from relatively thin gauge plates and taper inwardly in both web and flange from the central portion of the members with the channel webs 17 terminating in transversely enlarged rounded end portions 18. The taper of members 13 provides a shaped beam having maximum sectional area in the mid-section where loads are at a maximum and a gradually decreasing sectional area in a direction towards either end of the beam to adjust for decreasing loads in those areas. The beam thus provides for efficient utilization of beam material and holds weight to a minimum.

As shown in FIG. 3, the outer end portions of beam 4 are substantially of constant depth. The taper of flanges 14 and 15, however, is continued in an increased amount in these end portions to form a V-shaped notch 19 at the beam extremities. Flange material having no appreciable load resisting function is thus removed from the beam.

As previously explained, beam 4 is provided with eyes 9 and 12 at the mid-section and ends of the beam respectively for connection to support means depending from vehicle frame 1 and axles 2, respectively. Eye 9 is formed by a cylindrical sleeve 20 inserted through a pair of aligned openings 21 provided in the mid-section of opposed channel webs 17. Sleeve 20 is rigidly supported within openings 21 by a circumferential fillet weld 22 disposed at either end of the sleeve adjacent the outer surface of channel web 17.

A bearing sleeve 23, similar to sleeve 20, is inserted through the aligned openings 24 formed in opposed web sections 17 at the ends of the beam to form each eye 12. A circumferential fillet weld 25 likewise secures sleeve 23 within the openings. Sleeves 20 and 23 provide a suitable bearing surface for rotatable pins 8 and 11 respectively and increase beam rigidity.

The channel members of the beam may be readily pressed from blank form and assembled with a minimum of time and expense. Further, due to the particular configuration of the beam, effective use is made of the available material in resisting load. These factors, in turn, give rise to the low cost and lightweight of the beam of the invention. It is contemplated to heat-treat the beam once assembled enabling the beam to compare favorably in strength to solid beams and to provide the desired grain structure.

In one instance, a beam fabricated according to the invention and measuring 48 inches from center line to center line of the end eyes weighed 62.5 pounds as compared to 101 pounds for a beam of solid construction and of corresponding strength and size. This substantial weight reduction was accomplished with reduced cost.

Various modes of carrying out the invention are contemplated as being within the scope of the following claims particularly pointing out and distinctly claiming the subject matter regarded as the nature of the invention.

I claim:

1. An equalizer beam adapted for use on a wheeled vehicle having tandem axles, comprising a pair of channel-section members disposed with the flanges thereof extending in a horizontal plane and relatively toward the flanges of the other of said members, means for securing the flanges of one of said channel members to the corresponding flanges of the other of said channel members to form a box-section, said channel members being provided with web and flange sections having a maximum dimension at the mid-section of the beam and tapering inwardly relatively toward the beam ends, said web section terminating in arcuate shaped ends and said flanges tapering sharply at the channel extremities to form a V-shaped notch in the beam ends, said channel member being provided with longitudinally aligned openings in the mid-section and at each end of said channel in the web section thereof, said other channel member being provided with corresponding openings in its web section and disposed in alignment with the openings in said first channel member, and bearing sleeves extended through each pair of aligned openings and secured therewithin.

2. A fabricated equalizer beam adapted for use on a wheeled vehicle body having tandem axles, comprising interfitting channel members secured with their flanges extending relatively toward one another in overlapping relation, said channel members tapering inwardly in both flange and web towards the ends of the beam and having the channel flanges tapering sharply inwardly adjacent the beam ends and spaced from the corresponding flange of the opposite channel member to form generally open beam ends, the web of each channel member being provided with openings in the end portions and at the mid-section thereof with said openings being aligned with the corresponding openings in the other channel member, and bearing means secured in each pair of aligned openings for receiving support means from said tandem axles and said vehicle.

References Cited in the file of this patent

UNITED STATES PATENTS

| | | |
|---|---|---|
| 1,739,450 | Fageol | Dec. 10, 1929 |
| 1,925,536 | Judd | Sept. 5, 1933 |
| 2,085,214 | Francis | June 29, 1937 |
| 2,173,525 | Wallace | Sept. 19, 1939 |
| 2,479,327 | Double | Aug. 16, 1949 |
| 2,754,132 | Martin | July 10, 1956 |